United States Patent
Fitch et al.

(10) Patent No.: US 9,227,562 B2
(45) Date of Patent: Jan. 5, 2016

(54) VEHICLE RIM ALERT SYSTEM AND METHOD

(71) Applicants: Cassandra Denise Fitch, Washington, DC (US); Vergia Mae Fitch, Washington, DC (US)

(72) Inventors: Cassandra Denise Fitch, Washington, DC (US); Vergia Mae Fitch, Washington, DC (US)

( * ) Notice: Subject to any disclaimer, the term of this patent is extended or adjusted under 35 U.S.C. 154(b) by 0 days.

(21) Appl. No.: 14/201,854

(22) Filed: Mar. 8, 2014

(65) Prior Publication Data

US 2014/0266768 A1 Sep. 18, 2014

Related U.S. Application Data

(60) Provisional application No. 61/851,770, filed on Mar. 13, 2013.

(51) Int. Cl.
*G08B 5/00* (2006.01)
*B60Q 1/52* (2006.01)
*B60Q 1/32* (2006.01)

(52) U.S. Cl.
CPC *B60Q 1/52* (2013.01); *B60Q 1/326* (2013.01); *B60Q 2900/30* (2013.01)

(58) Field of Classification Search
USPC ............... 340/815.65, 425.5, 426.1; 40/587; 362/500, 464, 80
See application file for complete search history.

(56) References Cited

U.S. PATENT DOCUMENTS

| 7,150,549 B2 * | 12/2006 | Olds et al. ............ 362/500 |
| 2004/0042227 A1 * | 3/2004 | Gloodt et al. ............ 362/500 |
| 2005/0099820 A1 * | 5/2005 | Cooper ............ 362/500 |
| 2008/0105345 A1 * | 5/2008 | Fenkanyn et al. ............ 152/152.1 |

* cited by examiner

*Primary Examiner* — Daryl Pope
(74) *Attorney, Agent, or Firm* — Gary P. Topolosky

(57) ABSTRACT

There is disclosed an improved illuminating vehicle wheel cover system that remotely activates a plurality of lights about a vehicle wheel in either a solid or flashing pattern. The lights can be in multiple color pairs and used for aesthetics or to indicate an emergency situation. The remote can be synchronized to the key fob of the vehicle and/or wirelessly connect to a preset medical emergency facility or the nearest facility geographically.

18 Claims, 4 Drawing Sheets

VEHICLE RIM ALERT SYSTEM AND METHOD

CROSS-REFERENCE TO RELATED APPLICATION

This is a perfection of U.S. Provisional Application Ser. No. 61/851,770, filed on Mar. 13, 2013, the disclosure of which is fully incorporated by reference herein.

FIELD OF THE INVENTION

The field of this invention is illumination. Specifically, the present invention is directed to the unique and improved illumination of vehicle wheel covers and rims (especially for cars, light trucks and SUV's) using colored light emitting diodes (LED's), other currently known or subsequently developed remote lighting technologies and/or combinations thereof.

The primary intent of this invention is to allow its users to remotely activate (i.e. turn on and off) the various illuminated wheel covers: (a) for aesthetic reasons such as attention-grabbing or competitive uses in parades and the like, (b) and for the emergency alerting of passersby and fellow road travelers. The invention preferably uses a plurality of colored lights, per wheel, and may be engaged for illuminating when stopped, parked, and/or travelling at regular to low speeds. For certain emergency vehicles like police cars, ambulances, fire trucks and the like, a similar version can be used for providing even greater, on road visibility.

BACKGROUND OF THE INVENTION

Folks are always finding new uses for electronic components. The present invention has combined state of the art electronics with trends in modified and customized vehicles. This combination lends itself to an interesting means of self-expression. In addition, the same set of wheel lights can serve as means for clearing traffic to allow its users easier access to an emergency facility such as a hospital or the like.

Past attempts to illuminate wheels have been tried but proven to be expensive and difficult to operate. In chronological order, consider the following art:

Knauff U.S. Pat. No. 4,383,244 taught a multi-light display device and generator that accomplishes a "strobe" effect with LED's.

Pearsall et al. U.S. Pat. No. 4,775,919 taught a lighted wheel cover with a self-contained generator that includes an inner and outer housing which use a magnetic field to induce current flow.

DiMaggio U.S. Pat. No. 5,016,144 showed schematics for an illuminated wheel cover with crossed lights on each wheel.

O'Donnell U.S. Pat. No. 5,497,302 taught a snap on, round vehicle hub cap cover that lights.

Spicer U.S. Pat. No. 6,176,603 showed a mechanical option for illuminating a vehicle wheel from behind the very wheel itself.

Chung U.S. Pat. No. 6,382,820 improved on the foregoing by adding a novelty center hub that, upon rotation, will spell out a word/logo such as the well known letters for car manufacturer: BMW.

Castro U.S. Pat. No. 6,923,561 showed yet another alternative means for hard wiring a plurality of lights from behind a vehicle wheel.

Finally, Thomas et al. U.S. Pat. No. 7,377,676 taught yet another method and apparatus for illuminating the very surface of a vehicle wheel.

Yet, none of the prior art references found show means for illuminating a wheel, in multiple colors, while stopped or moving, for the most important reason of alerting others about an emergency condition. With multiple colors and color-coding, these remote controlled lighting systems can let other persons on the road of a medical emergency. Alternately, the same type of remote controlled lighting mechanisms can be used to focus the attentions of other drivers to an emergency vehicle: police, fire, ambulance, etc.

SUMMARY OF THE INVENTION

An object of the present invention is to provide a unique and aesthetically pleasing display of lights on each of four vehicle wheels. Another object of the present invention is to provide an arrangement of electronic circuitry for remotely activating these lights from inside the vehicle (whether moving or stopped). Yet another object of this invention is to provide a source of notifying others on the road know of an emergency situation. At the same time, the authorities can be notified of "the" emergency (wirelessly) so as to be ready to receive the patient or other person in need of care.

This invention takes a novel approach to the preferred end uses for an illuminated vehicle wheel rather than for the mechanical/electrical means of actual illumination. One preferred version uses Light Emitting Diodes (LED's) arranged in an aesthetically pleasing manner within or possibly partially behind each vehicle wheel for remote activation via a visor switch, key fob or both. For even greater visibility, these lights can be emitted from a base/main wheel cover that is silver or gold in color.

BRIEF DESCRIPTION OF THE DRAWINGS

Further features, objectives and advantages of this invention will be made clearer from the following detailed description made with reference to the accompanying drawings in which.

DETAILED DESCRIPTION OF PREFERRED EMBODIMENTS

There are various known methods for providing lights to a vehicle wheel, from inside the wheel or the wheel cover, from about the wheel perimeter, etc. One such system employs LED's manufactured with a particular visible bandwidth. Other variations provide broader visibility, up to 180 degrees. Still other lighting systems accommodate colors and/or strobe effects.

The simplest source of powering such lights from an internal 9 volt battery. It may also be possible to kinetically power the lights of this invention (via the rotation of a wheel for charging an energy source. Alternately, there may be solar powered alternatives and/or hard wiring to the main power source of the vehicle proper.

The wheels may be manufactured as an integral unit (with lights AND power source) that can easily connect to the remote activation means included. If just a hub or wheel cover, rather than a whole wheel per se, there may be included various means for attaching the illuminating cover to an existing wheel/rim. Such means include frictional engagement to an interior wheel circumference, magnets, clips and numerous other new or conventional means. Furthermore, locking means (not shown) may be integrated for preventing/deterring theft of the invention.

Figure 1:
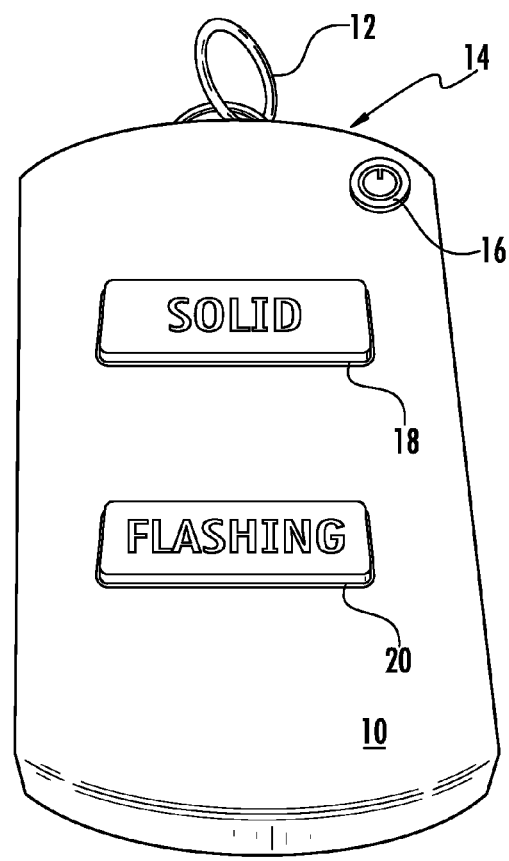
FIG. 1 is a top plan view of a keychain remote control activator for use with one embodiment.

Referring now to FIG. 1, there is shown a first embodiment of remote 10 having a keychain connector 12 along one edge (as shown, the top center 14 to remote 10). Alternate clip locations are also anticipated hereby.

The remote includes a first button 16 that serves as a main switch for activating the bright lights on the wheel covers themselves. A first On-Off indicator 18, for thumb or finger activation, sits towards the middle to top half of remote 10. It can be used to activate the wheel lights in a solid array. It can also be programmed to activate between more than one set of SOLID light colors so that a single strike might turn on the yellow wheel lights, a double (or second strike) the blues and three hits or a third strike, a third color (red/green, etc).

Apart from the solid switch 18, as shown situated below that switch on the same remote front, there is an emergency activation switch 20 designed to make the lights of this invention intentionally flash on and off . . . though not necessarily in a strobe manner. Like solid switch 20, flashing switch 20 can be programmed to advance through multiple lights individually or in series. Ideally though, it is preferred that the flashing switch activate either all lights at once, or better still, alternate between colors altogether.

Preferred embodiments of this invention would further include one or more options (not shown). Each remote can be "locked" with a code (numeric or otherwise) so as to avoid accidental activation with a child's play, knee tap or the proverbial pocket activation (a/k/a "butt dial" on a cell phone). The keychain remote should also be separately programmable to incorporate the vehicle's critical start/stop information, a la a true key "fob". Finally, in a most preferred version, remote 10 is further programmed to wirelessly transmit to a pre-programmed phone number, or to the nearest emergency facility, WHEN the lock has been activated and the flashing emergency light engaged. For instance, in the event of a medical emergency or early baby arrival (delivery has started), the nearest hospital can be alerted and signaled at the same time. This would accommodate travel concerns until the normal cell phone contacts can be made.

Figure 2:
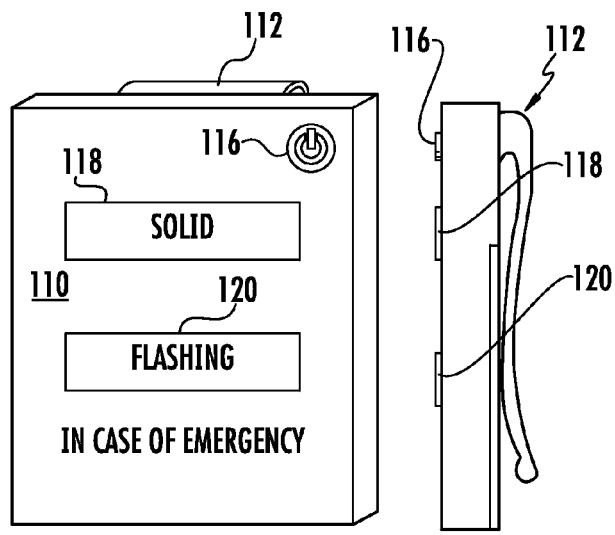
FIG. 2 is a top (left) and side (right) view of a second embodiment of remote control with a clip for fastening to the visor or other remote area of a vehicle interior.

FIG. 2 shows an alternate variation of remote 110 having a clip connector 112 rather than keychain connect. Like the earlier model, all other variations would be included such as its own first button 116, solid switch 118 and emergency/flashing switch 120.

Figure 3:
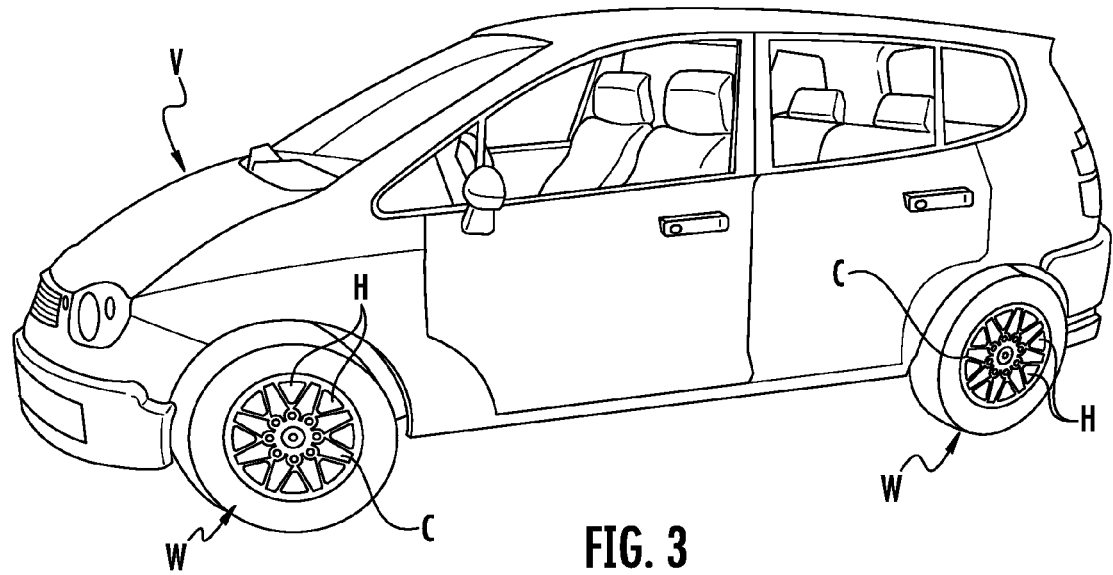
FIG. 3 is a perspective view of one representative vehicle having a standard hub cover over each of the wheels as shown.
Figure 4:
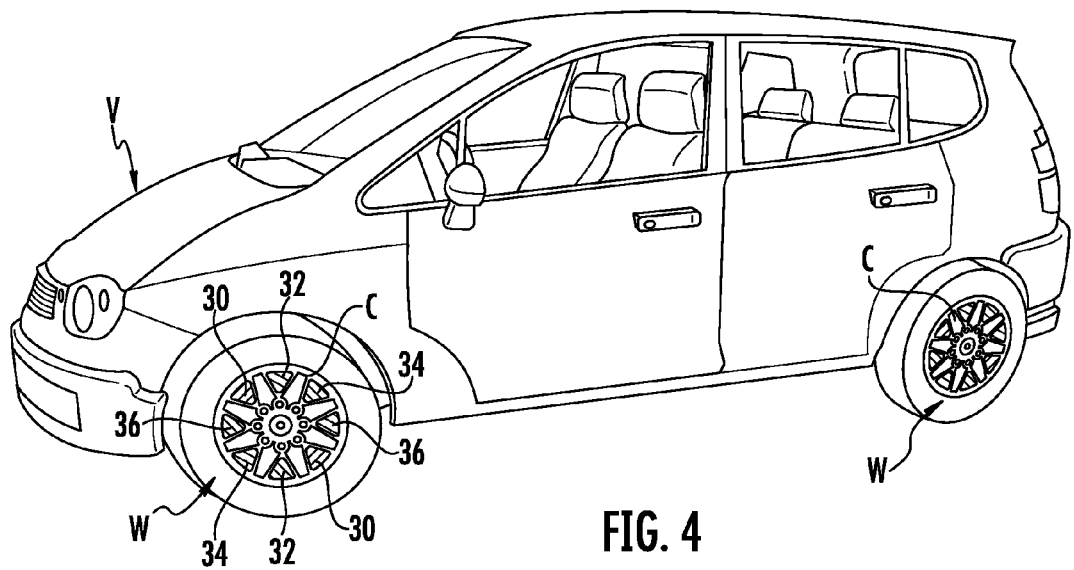
FIG. 4 is a perspective view of the invention installed with sets of illuminated areas incorporated between regions of the wheel hub covers from FIG. 3, though not "turned on" in this view.
Figure 5:
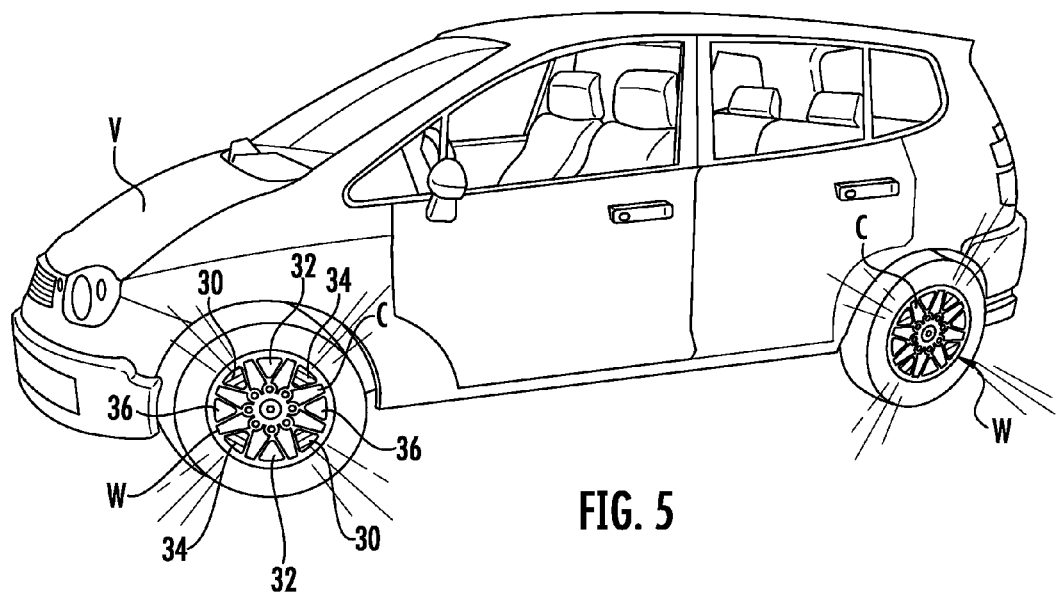
FIG. 5 is a perspective view of the wheel hub covers from FIGS. 3 and 4, flashing "on" in two distinct colors on a stopped vehicle per one embodiment of this invention.

Referring now to FIGS. 3 through 5, there is sequentially shown a representative vehicle V having a set of wheels W each with its own wheel cover C and spaced apart vent holes H therearound. The model depicted in FIG. 3 has standard wheel covers that do not illuminate according to this invention.

Comparatively, the vehicle V of FIG. 4 includes its own set of wheels W, each having a wheel cover C. But in this instance, the wheel holes are replaced with a series of lights. As shown, the representative vehicle includes four pairs of matching lights, a first set 30 at opposed ends of wheel W, followed by lights of a second color 32, third color 34 and fourth color 36. It is easy to imagine these light pairs being in the primary colors yellow, blue, green and red.

Finally, in FIG. 5, the remote has been used to activate 3 pairs of lights. For illustration purposes, that would be light pair/sets 30, 32 and 36 with light pair 34 shown currently "off". It is to be understood that these light pairs can be sequentially turned ON as a solid light . . . in sets/pairs. Alternately, if activated in an emergency mode, the three light sets depicted can be meant to flash on and off—altogether, in sets of 2 or more, or sequentially about the entire wheel cover C.

In one preferred embodiment, the base wheel covers themselves are made/colored silver or gold for greater visibility. As for the lighted segments, they can brightly lit as red lights, blue lights, or multiple combinations of lights. For greater daylight visibility, red and yellow or gold are especially suitable; for nighttime use, the user/buyer may be able to select between-among several "optional" colors or color combinations.

The foregoing description of the invention has been directed to a particular preferred embodiment of the present invention for purposes of explanation and illustration. It will be apparent to those skilled in the art that many modifications and changes in the illuminating wheel covers may be made without departing from the scope and spirit of the invention. It is, therefore, intended that the following claims cover such modifications and changes:

What is claimed is:

1. A vehicle rim alert system comprising:
    a plurality of colored light pairs for installation on each wheel of a vehicle;
    a power source for each wheel;
    means for remotely activating the colored light pairs in either a solid or flashing mode from within the vehicle while moving or stopped; and
    a lockout mechanism before the flashing mode can be remotely activated.

2. The vehicle rim alert system of claim 1 wherein said power source is a 9-volt battery.

3. The vehicle rim alert system of claim 1 wherein said remote activating means includes a visor clip attachment.

4. The vehicle rim alert system of claim 1 wherein said remote activating means includes a connector to a keychain.

5. The vehicle rim alert system of claim 4 wherein said remote activating means can be synchronized to an on-off engine switch for the vehicle.

6. The vehicle rim alert system of claim 1 wherein the colored light pairs install directly to each wheel of the vehicle.

7. The vehicle rim alert system of claim 1 wherein the colored light pairs install onto a wheel cover for each wheel of the vehicle.

8. The vehicle rim alert system of claim 1 wherein the colored light pairs install at least partially behind and through a wheel cover for each wheel of the vehicle.

9. The vehicle rim alert system of claim 1 wherein said remote activating means can be synchronized to alert a pre-programmed emergency number when the flashing mode has been activated.

10. The vehicle rim alert system of claim 1 wherein said remote activating means can be synchronized to alert a geographically nearby emergency facility or provider when the flashing mode has been activated.

11. A vehicle rim alert system comprising:
    a plurality of colored light pairs for installation on a wheel cover for each wheel of a vehicle;
    a power source for each wheel; and means for remotely activating the colored light pairs in either a solid or flashing mode from within the vehicle while moving or stopped, said means including: (i) a lockout mechanism before the flashing mode can be remotely activated; and (ii) means for alerting a geographically nearby emergency facility or provider when the flashing mode has been activated.

12. The vehicle rim alert system of claim 11 wherein said remote activating means includes a visor clip attachment.

13. The vehicle rim alert system of claim 11 wherein said remote activating means includes a connector to a keychain.

14. A method for remotely alerting others about an emergency situation within a vehicle said method comprising:
   a. providing each rim of the vehicle with a plurality of colored light pairs, a power source and means for remotely activating the colored light pairs in a solid or flashing mode while the vehicle is moving or stopped, said remote activating means including a lockout mechanism before the flashing mode can be activated; and
   b. remotely activating the colored light pairs from within the vehicle in an emergency situation.

15. The method of claim 14 wherein the colored light pairs are activated to flash for signaling an emergency within the vehicle.

16. The method of claim 14 wherein the remote light activator further includes means for alerting a pre-programmed emergency number when the flashing mode has been activated.

17. The method of claim 14 wherein the remote light activator further includes means for alerting a geographically nearby emergency facility or provider when the flashing mode has been activated.

18. The method of claim 14 wherein said remote activating means includes at least one of: a visor clip attachment and a connector to a keychain.

\* \* \* \* \*